Aug. 16, 1960 C. A. BENOIT 2,949,552
MAGNETIC DRIVES NOTABLY THOSE OF TACHOMETERS
Filed May 13, 1958

INVENTOR
CLAUDE A. BENOIT
By Irwin S. Thompson
ATTY.

United States Patent Office 2,949,552
Patented Aug. 16, 1960

2,949,552
MAGNETIC DRIVES NOTABLY THOSE OF TACHOMETERS

Claude Amand Benoit, Paris, France, assignor to Société STEB, Courbevoie, France, a corporation of France Filed May 13, 1958, Ser. No. 734,878

Claims priority, application France May 23, 1957

5 Claims. (Cl. 310—105)

The invention has for an object improvements to magnetic drives of the type comprising a permanent magnet to be driven about an axis, and a driving member, constituted by a non-magnetic electroconductive body, placed in the field of the magnet. The rotation of the magnet inducing eddy currents in the conductor body, which creates a driving torque that, all things being equal, depends on the speed of rotation of the magnet.

A magnetic drive of this kind can be utilized as a reliable braking system, as a simple transmission or interposed in a measuring instrument such as a tachometer. In the latter case, an opposing spring compensates the torque furnished by the rotation of the magnet and gives the indication of the speed to be measured.

The problem posed by such apparatus is that of reliability. In effect, if the operating conditions deviate from those calibrated (for example variations of mechanical play, ambient temperature, etc.) it follows that the torque transmitted varies also, thus falsifying the measure. In particular, the influence of temperature is very difficult to eliminate. A variation of temperature acts a little on the magnetic circuit, but, on the other hand, a lot on the resistivity of the driving element.

The magnetic circuits heretofore realized had not permitted the application of a rational solution evidently consisting in employing alloys, such as constantan, in view of their strong resistivity. It is why only other alloys or metals more or less resistive to the influence of temperatures had been employed, which necessitated the employment of a compensation arrangement.

In every way, the possibility of adjusting the torque of such an apparatus, if it is insensible to play and to the influence of temperature, is indispensable if a perfect calibration is to be obtained. The adjustments which have been proposed until now consist in deplacing more or less the driving member in relation to the field, or again to leave this piece immobile and deplace longitudinally a field closure armature maintained in place by an appropriate mounting. The adjustment means are rather complex from the point of view of realization and are very sensitive to mechanical play.

Other methods also exist utilizing the variation of the magnetic reluctance of a magnetic circuit for modifying the value of the field consisting for example of angularly displacing a field closure armature integral with the magnet and comprising a certain number of polar zones. Such solutions do not permit the adjustment of the apparatus when functioning, nor the rational utilization of the flux of the magnet. Lastly, the non-progressive action of this system makes the adjustment delicate.

The invention has for an object to provide an adjustment of the torque that eliminates the above mentioned disadvantages. It consists, without acting on the driving conductor body, of a modification of the magnetic field by displacement of an exterior ring or magnetic material.

It applies, in particular, to an apparatus constituted by a magnet, integral with a field closure piece, comprising notches, and defining an air-gap in which is disposed a driving member in the form of a cylindrical ring whereby the driving is effected because this ring is crossed by a variable field resulting from the existence of the notches. The invention consists in this case to modify the distribution of the field in the air-gap, for example a decreasing of the field in regard to a polar mass, or viceversa, by longitudinal sliding motion of an exterior ring of magnetic material.

This mode of adjustment has multiple advantages. It can be effected in the course of operation. Not touching the other rotating members, the apparatus is not influenced by mechanical play. It possesses a progressive action.

Furthermore, an arrangement of this kind permits the realization of a magnetic circuit having a flux sufficient for the driving member to be of an alloy having a low temperature coefficient such as constantan and manganin, which makes the apparatus insensible to variations of temperature.

The invention will now be described with reference to the accompanying drawing which shows, in a non-limitative manner, one example of realizing a magnetic drive.

Figure 1:
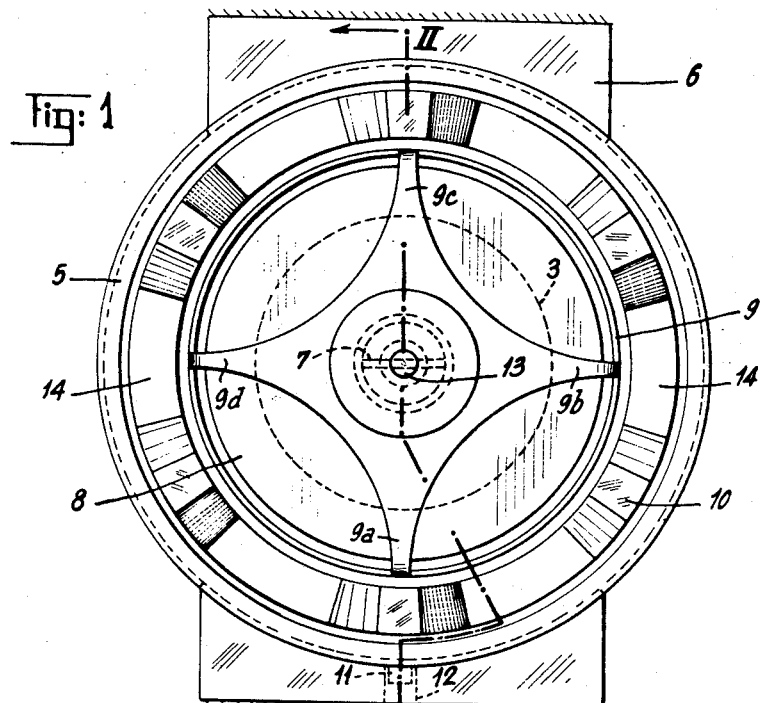
Figure 1 is a front elevational view.
Figure 2:
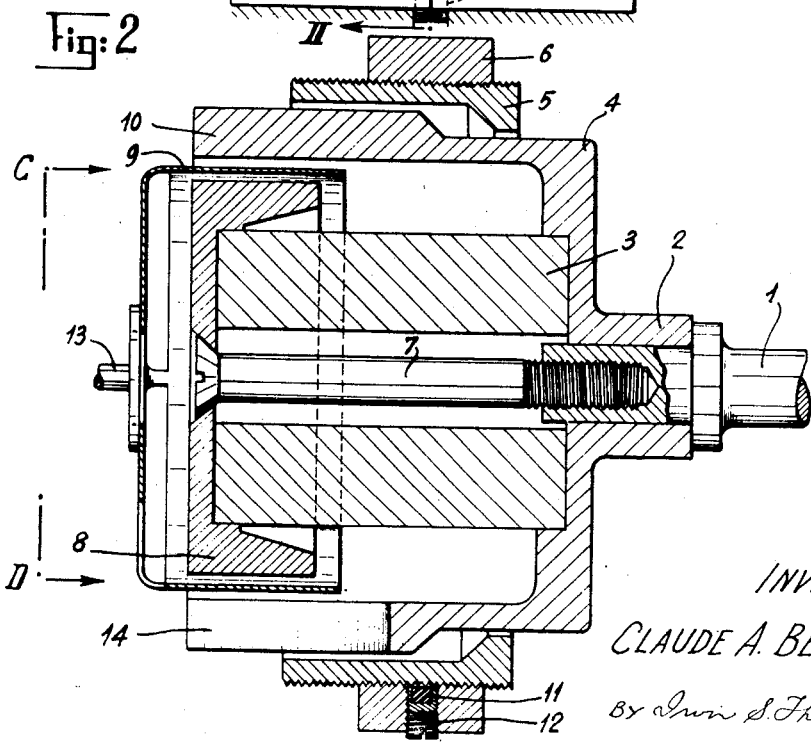
Figure 2 is a sectional view taken along line II—II of Figure 1.

In the drawings, 1 is the motor shaft on which is keyed by a hub 2 the magnetic pot 4. This pot carries the two-pole magnet 3 mounted on the same axis as shaft 1 and centered in a recess of the piece 4. This closes the magnetic field produced by the magnet 3.

At the free end of the magnet 3 is fixed a field plate 8, of circular form, a screw 7 of non-magnetic alloy maintains the assembly of the pieces 4, 3 and 8 in place. The part of closure piece 4 situated in regard to the field plate 8 comprises a certain number of notches 14 giving the effect of an equal number of pole masses, preferably trapezoidal, as can be seen in Fig. 1. In the air-gap delimited by the pieces 4 and 8 and passing substantially beyond each end of this air-gap is disposed a ring 9 of a non-magnetic material, but electro-conductive and of low resistivity, such as constantan, extending towards the interior beyond the air-gap having four arms 9a, 9b, 9c and 9d, integral with a shaft 13 co-axial with the apparatus.

An adjustable magnetic sleeve 5 screw-threaded on its outside periphery, is screwed in a support 6 integral with the frame-work. It can therefore be axially displaced and then secured in the chosen position by means of a locking-screw 12 through the intermediary of a block 11. The ring surrounds the magnetic armature 4 without coming into contact with the latter and partially covers the notches 14 which are there arranged. This ring can also be internally screw-threaded and screwed directly on the magnetic armature. A clamping arrangement permits the same securing of the ring on the magnetic armature.

The adjustment of the torque is effected in a very simple manner by screwing or unscrewing the said ring, which then covers over more or less the notched part of the air-gap, which has the effect of modifying the repartition of the field in this air-gap. In moving the said ring over the said notches, the relation of the fields compared with the polar masses 10 and compared with the notches 14 tends to decrease, the torque tends to lessen and viceversa. Experience has moreover shown that the effect of the ring is appreciably proportional to its displacement.

It will be seen that it is possible to obtain an adjustment of the apparatus when functioning, adjustment which can be very progressive and without any modification of the active elements (magnet or drive member); since there is no modification of the relative position of these two elements, as previously stated, the cylindrical ring is substantially larger than the active zone of the air-gap, thus eliminating the torque due to the mechanical play. On the other hand, the effective flux of the magnet remains practically constant, only the lengthwise distribution of the air-gap is modified, which corresponds well to a favourable utilization of this magnet.

I claim:

1. A magnetic drive device with adjustable torque, of the eddy current type, comprising in combination a rotating shaft, an element of soft iron in the shape of a cup fixed coaxially on said shaft, a permanent two-pole magnet of cylindrical shape with two terminal faces of opposite polarity fixed along one of said faces on the bottom of said cup coaxially with respect thereto, a cup-shaped pole plate having a cylindrical lateral surface fixed axially on the other free pole face of said magnet, said cup-shaped soft iron element having in its annular wall notches delimiting the polar projections, the bottoms of the notches being at a distance from the plane of the external terminal face of the cup-shaped pole plate which is greater than the length taken along the axis of the external cylindrical surface of said cup-shaped pole plate, the periphery of said cup-shaped pole plate being a very small distance away from the polar projections of said element so as to form an air gap in which is thus created a radial field which is totally divergent or totally convergent depending on whether the polarity of said pole plate is North or South, said field being of great intensity in the regions of the polar projections and of small intensity in the regions of the notches, a second shaft mounted in line with the first rotating shaft, the two shafts being mechanically independent with respect to each other, a driven element of non-magnetic metal in the shape of a hollow cylinder rigidly fixed to said second shaft, mounted coaxially with respect to said second shaft and extending into said air gap, a ring of soft iron surrounding the cup-shaped element and capable of axial displacement to cover the notches of said cup to a greater or less extent so that the relation of the fields in the region of a polar projection and in the region of a notch can be varied.

2. A magnetic drive device in accordance with claim 1 in which the axially displaceable ring is mechanically independent from the cup-shaped element of soft iron and comprises a fixed container casing, and means on the internal face of the casing and on the external face of the ring for causing axial displacement of said ring relative to said casing.

3. A magnetic drive device in accordance with claim 1 in which the axially displaceable ring is rigidly fixed mechanically with respect to the cup-shaped element, and means on the external face of said cup-shaped element and on the internal face of said ring for permitting axial displacement of said ring relative to said casing.

4. A device in accordance with claim 1, in which the driven element is constructed of an electrically conducting material having a resistivity which varies only slightly with temperature.

5. A device as in claim 1, the driven element being constantan.

References Cited in the file of this patent
UNITED STATES PATENTS

| | | |
|---|---|---|
| 2,263,264 | Duwe | Nov. 18, 1941 |
| 2,605,875 | Stephenson | Aug. 5, 1952 |